United States Patent [19]

Kikuchi

[11] Patent Number: 4,963,010
[45] Date of Patent: Oct. 16, 1990

[54] COMPACT ZOOM LENS SYSTEM

[75] Inventor: Juro Kikuchi, Yamanashi, Japan

[73] Assignee: Olympus Optical Co., Ltd., Tokyo, Japan

[21] Appl. No.: 392,572

[22] Filed: Aug. 11, 1989

[30] Foreign Application Priority Data

Aug. 16, 1988 [JP] Japan .................... 63-202699

[51] Int. Cl.⁵ ............................................. G02B 15/15
[52] U.S. Cl. ................................... 350/481; 350/423
[58] Field of Search ........................... 350/481, 423

[56] References Cited

U.S. PATENT DOCUMENTS 4,682,860  7/1987  Tanaka et al.
4,720,179  1/1988  Ito
4,776,679  10/1988  Kitagishi et al.

FOREIGN PATENT DOCUMENTS 3611590  10/1986  Fed. Rep. of Germany ...... 350/423
61-259216  11/1986  Japan.
62-264019  11/1987  Japan.
64-38711  2/1989  Japan.

Primary Examiner—Bruce Y. Arnold
Assistant Examiner—Rebecca D. Gass
Attorney, Agent, or Firm—Cushman, Darby & Cushman

[57] ABSTRACT

A compact zoom lens system consisting of a small number of lens elements and having a short total length, said zoom lens system comprising a first lens unit having positive refractive power and a second lens unit having negative refractive power which are arranged in the order from the object side, an aperture stop arranged in said first lens unit, at least one lens component arranged after said aperture stop in said first lens unit and at least one graded refractive index lens having refractive index gradient in the direction perpendicular to the optical axis in said first lens unit.

12 Claims, 10 Drawing Sheets

COMPACT ZOOM LENS SYSTEM

BACKGROUND OF THE INVENTION (a) Field of the Invention

The present invention relates to a zoom lens system, and more specifically to a compact zoom lens system suited for use with compact cameras.

(b) Description of the Prior Art

In the recent years where cameras are automated and designed compact, it is strongly demanded to develop compact photographic lens systems. On the other hand, it is strongly needed to switch photographic lens systems between the wide position and the tele position even for simple cameras such as lens shutter cameras which do not permit exchange of photographic lens systems and it is practised accordingly to design photographic lens systems as zoom lens systems. However, zoom lens systems are usually larger and especially longer in total lengths thereof than lens systems designed for use at a single focal point. Therefore, adoption of zoom lens systems is conflicting with the demand for compact cameras.

As zoom lens systems having total lengths as short as possible and compatible with compact cameras, there have already been proposed so-called telephoto type zoom lens systems each consisting of two lens units, i.e., a front lens unit having positive refractive power and a rear lens unit having negative refractive power. So far as zooming ratios are within a range of up to 2, it is possible to design the zoom lens systems of this type so as to be compact and have high performance. The zoom lens system disclosed by Japanese Unexamined Published Patent Application No. 264019/62, for example, is a zoom lens system consisting of eight lens elements and having high performance owing to the fact that the zoom lens system adopts an aspherical surface.

When an attempt is made to design a more compact zoom lens system, however, there is posed a problem. Speaking concretely, it is generally necessary to strengthen the refractive power of each lens element by shortening the radius of curvature on each lens surface in order to shorten the total length of a zoom lens system. However, the shift of a lens element having strong refractive power results in remarkable variation of aberrations, thereby degrading imaging performance of the zoom lens system. In order to reduce the variation of aberrations, it is necessary to use a large number of lens elements, thereby making it impossible to shorten total length of the zoom lens system.

In order to solve this problem, it is conceivable to use the so-called graded refractive index lens (GRIN lens). For example, Japanese Unexamined Published Patent Application No. 259216/61 discloses a telephoto type zoom lens system consisting of two lens units in which number of lens elements are made very small by using a GRIN lens having refractive index gradient in the direction along the optical axis (so-called axial GRIN lens) and/or a GRIN lens having refractive index gradient in the direction perpendicular to the optical axis (radial GRIN lens). However, this zoom lens system has a low zooming ratio of 1.5 at best and a defect that it cannot provide a sufficient effect of the focal length change.

SUMMARY OF THE INVENTION

A primary object of the present invention is to provide a zoom lens system having a high zooming ratio and designed compact.

Another object of the present invention is to provide a zoom lens system of the telephoto type consisting of two lens units and comprising a very small number of lens components.

The zoom lens system according to the present invention consists, in the order from the object side, a first lens unit having positive refractive power and a second lens unit having negative refractive power, and is so adopted as to change focal length thereof by varying an airspace reserved between these lens units, said first lens unit comprising an aperture stop and at least one lens element arranged on each side of said aperture stop as well as a radial GRIN lens having refractive power gradient in the direction perpendicular to the optical axis.

By adopting the composition described above for the first lens unit, the present invention has succeeded in shortening total length of said first lens unit, thereby shortening total length of the zoom lens system as a whole and making said zoom lens system compact accordingly. Further, the present invention has succeeded in remarkably reducing number of lens elements by utilizing the high aberration correcting capability of the radial GRIN lens arranged in the first lens unit.

The first lens unit has positive refractive power and consists only of positive lens components. If the first lens unit consists only of homogeneous lens elements, chromatic aberration and curvature of field cannot be corrected even by using an aspherical surface and the first lens unit will require at least one negative lens element. If a negative lens element is arranged in the first lens unit, it will be necessary to use positive lens elements in a number larger than that of the negative lens element(s) for imparting positive refractive power to the first lens unit, whereby the first lens unit will comprise a large number of lens elements and have a long total length.

By arranging the graded refractive index lens having refractive index gradient in the direction perpendicular to the optical axis, the zoom lens system according to the present invention is so designed as to correct the chromatic aberration and curvature of field without using a negative lens element, and has the aberration correcting effect similar to that available by using an aspherical surface. This design has made it possible to compose the first lens unit of a small number of lens elements and shorten total length, thereby shortening total length of the zoom lens system accordingly.

When the first lens unit is divided into a first subunit located on the object side of the aperture stop and a second subunit located on the image side of said aperture stop, each of these two subunits having positive refractive power, this composition permits shortening total length of the zoom lens system by eliminating unnecessary space.

In order to shorten the airspace reserved between the first lens unit and the second lens unit by modifying power distribution in the first lens unit, it is sufficient to displace the rear principal point of the first lens unit toward the object side. For this purpose, it is undesirable to design the first lens unit as the retrofocus type, but the first lens unit may be designed as the telephoto type. When the first lens unit is designed as the telephoto type, however, the rear principal point thereof will be displaced to much toward the object side and it will be obliged to displace also the front principal point of the second lens unit toward the object side. When the front principal point of the second lens unit is displaced toward the object side, the rear principal point thereof is also displaced toward the object side, thereby undesirably shortening the airspace reserved between the second lens unit and the image surface.

On the other hand, it is conceivable to shorten the airspace reserved between the first lens unit and the second lens unit by displacing the front principal point of the second lens unit toward the image side. However, this method is also undesirable since it is necessary for displacing the front principal point of the second lens unit toward the image side to strengthen power of each lens component arranged in the second lens unit while allowing larger variation of aberrations in the second lens unit, and a larger number of lens components must be used for reducing the variation of aberrations.

The present invention shortens the airspace reserved between the first lens unit and the second lens unit, and shortens total length of the zoom lens system accordingly by imparting positive powers to both the first subunit and the second subunit arranged in the first lens unit.

Further, the zoom lens system according to the present invention uses, in the first lens unit, a graded refractive index lens having refractive index gradient in the direction perpendicular to the optical axis, and it will be more desirable for very favorable correction of aberrations to use two or more graded refractive index lenses.

When a graded refractive index lens having refractive index gradients in the direction perpendicular to the optical axis is used, no negative lens component is necessary for correcting aberrations and the first lens unit can be composed only of positive lens components.

By composing the first lens unit of a plurality of positive lens components and arranging these lens components on the object side of and on the image side of the aperture stop respectively, it is easy to share the rolls for correcting the axial aberrations and off axial aberrations between these lens components. This composition of the first lens unit makes it possible to cancel variation degree of astigmatism and distortion caused in the first lens unit by zooming with that of astigmatism and distortion caused in the second lens unit, and correct these aberrations favorably in all the zooming conditions.

By composing the first lens unit of a plurality of positive lens components each having refractive index gradient in the direction perpendicular to the optical axis, it is possible to further improve image quality. Accordingly, it is possible to improve performance of the zoom lens system by adequately dividing the lens components arranged in the first lens unit so that the first lens unit comprises two or more graded refractive index lenses.

For the zoom lens system according to the present invention having the composition described above, it is preferable to design it so as to satisfy the following conditions (1) and (2):

$$0.1 < d_2/d_3 < 1.7 \qquad (1)$$

$$f_1/5 < d_2 + d_3 < f_1/2 \qquad (2)$$

wherein the reference symbol f represents focal length of the first lens unit, the reference symbol $d_2$ designates the airspace reserved between the first subunit and the aperture stop, and the reference symbol $d_3$ denotes the airspace reserved between the aperture stop and the second subunit.

When the positive refractive power of the first lens unit in imparted mainly to the second subunit in the above-described composition of the zoom lens system according to the present invention, aberrations are aggravated in the second subunit.

Out of these aberrations, the off axial aberrations can be suppressed by arranging the surface having the strongest power in the second subunit concentrically with regard to the aperture stop.

The axial aberrations are corrected by producing, in the graded refractive index lens having positive refractive power used in the first subunit, such aberrations as to be produced by a negative homogeneous lens.

If $d_2/d_3$ exceeds the upper limit of 1.7 of the condition (1) to locate the first subunit too far from the aperture stop in the first lens unit composed as described above, the function of the graded refractive index lens will strongly influence not only on the axial aberrations but also on astigmatism. When a strong function for correcting the axial aberrations is imparted to this graded refractive index lens, the function will influence also on astigmatism, thereby resulting in overcorrection of astigmatism.

If $d_2/d_3$ is smaller than the lower limit of 0.1 of the condition (1), in contrast, the first subunit will undesirably interfere with the aperture stop.

For suppressing production of the off axial aberrations by arranging the surface having the strongest power in the second subunit concentrically with regard to the aperture stop, it is necessary to locate the second subunit apart from the aperture stop. For this purpose, $d_2+d_3$ must, while satisfying the condition (1), have a value larger than the lower limit of $f_1/5$ of the condition (2). If $d_2+d_3$ has a value smaller than the lower limit of the condition (2), coma and distortion will undesirably be aggravated. If $d_2+d_3$ has a value larger than the upper limit of $f_2/2$ of the condition (2), however, the effect for correcting the aberrations will not be enhanced and total length of the zoom lens system will undesirably be prolonged.

Further, it is desirable for focal length $f_{1F}$ of the first subunit arranged in the first lens unit to satisfy the following condition (3):

$$0 < 1/f_{1F} < 0.007/f_1 \qquad (3)$$

In the zoom lens system according to the present invention, the first subunit has the positive power for shortening the total length of the zoom lens system as described above. However, the rear principal point of the first lens unit must be located at a position shifted to a certain degree toward the image side and the first subunit cannot have so strong power. This is because the second lens unit consists of a plural number of lens components, and the lens component arranged on the extremely image side is designed as a negative meniscus lens component having a convex surface on the image side and strong power. Concretely speaking, in a case of a zoom lens system consisting of two lens units having positive power and negative power respectively in the order from the object side, like the zoom lens system according to the present invention, a negative meniscus lens component having a convex surface and strong power is generally arranged on the image side in the second lens unit. The lens component having the strongest power in the second lens unit has a surface nearly perpendicular to the principal ray so that said zoom lens system produces little aberrations and allows little variation of the aberrations in the second lens unit. Moreover, since the front principal point of the second lens unit is shifted toward the image side, the airspace reserved between the first lens unit and the second lens unit is apt to be narrowed. In order to broaden the airspace reserved between the first lens unit and the second lens unit, it is necessary to shift the rear principal point of the first lens unit to a certain degree toward the image side.

Furthermore, the zoom lens system according to the present invention is so designed as to compensate the spherical aberration and sine condition produced by the first subunit with the spherical aberration and sine condition produced by the second subunit. Moreover, the surfaces arranged on the extremely object side and the extremely image side respectively on the first subunit are convex on the object side so that the aberrations are not so remarkable as a total of the aberrations produced by these surfaces. Therefore, if the first subunit has power strong enough to exceed the upper limit of $0.007/f_1$ of the condition (3), the aberrations produced by the extremely image side surface of the second subunit cannot be cancelled.

If the lower limit of the condition (3) is exceeded, the first subunit will undesirably have negative power. If the upper limit of the condition (3) is exceeded, in contrast, it will be impossible to reserve the airspace between the first subunit and the second subunit or obtain favorable performance of the zoom lens system while making most of the merit in the composition of the second subunit.

DETAILED DESCRIPTION OF THE PREFERRED EMBODIMENTS

Figure 1A:
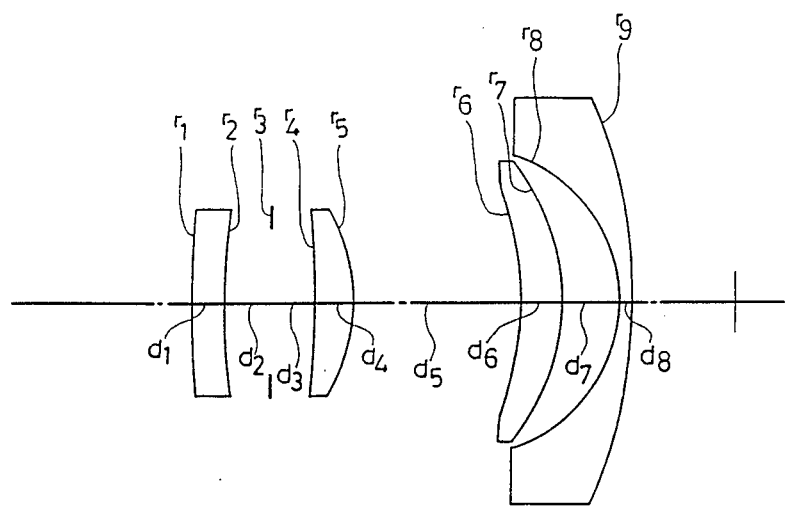
FIG. 1 shows sectional views illustrating composition of Embodiments 1 through 4 of the zoom lens system according to the present invention.

Now, the zoom lens system according to the present invention will be described more detailedly with reference to the accompanying drawings and the numerical data given below.

Embodiment 1

$f = 1.000-1.886$, F/4.6-F/5.7
$2\omega = 61.9°-35.3°$
$r_1 = 3.1265$
$d_1 = 0.0761$   $n_1 =$ graded refractive index lens (1)
$r_2 = 1.8345$
$d_2 = 0.1093$
$r_3 =$ stop
$d_3 = 0.1003$
$r_4 = -2.4548$
$d_4 = 0.0906$   $n_2 =$ graded refractive index lens (2)
$r_5 = -0.4110$
$d_5 =$ variable
$r_6 =$ aspherical surface
$d_6 = 0.0936$   $n_3 = 1.57135$   $\nu_3 = 52.92$
$r_7 = -0.5037$
$d_7 = 0.1297$
$r_8 = -0.3494$
$d_8 = 0.0306$   $n_4 = 1.74100$   $\nu_4 = 52.68$
$r_9 = -1.1586$
aspherical surface
$r = -0.6229$,   $A_1 = 0$
$A_2 = 0.15099 \times 10$,   $A_3 = 0.11917 \times 10^2$
$A_4 = 0.70306 \times 10^2$,   $A_5 = -0.11819 \times 10^3$

| f | 1.000 | 1.373 | 1.886 |
|---|---|---|---|
| $d_5$ | 0.382 | 0.214 | 0.092 | graded refractive index lens (1)
$n_{0d} = 1.60342$,   $n_{1d} = -0.89540$
$n_{2d} = 0.23828 \times 10^2$,   $n_{3d} = 0.22431 \times 10^3$
$n_{0c} = 1.59883$,   $n_{1c} = -0.90242$
$n_{2c} = 0.23740 \times 10^2$,   $n_{3c} = 0.22370 \times 10^3$
$n_{0F} = 1.61471$,   $n_{1F} = -0.87812$
$n_{2F} = 0.24043 \times 10^2$,   $n_{3F} = 0.22581 \times 10^3$
graded refractive index lens (2)
$n_{0d} = 1.62041$,   $n_{1d} = -0.43878$
$n_{2d} = -0.50462$,   $n_{3d} = -0.70460 \times 10$
$n_{0c} = 1.61727$,   $n_{1c} = -0.44340$
$n_{2c} = -0.57584$,   $n_{3c} = -0.76335 \times 10$
$n_{0F} = 1.62755$,   $n_{1F} = -0.42829$
$n_{2F} = -0.34266$,   $n_{3F} = 0.57098 \times 10$
$d_2/d_3 = 1.090$,   $d_2 + d_3 = 0.281 f_1$
$f_1 = 0.746$,   $1/f_{1F} = 0.002686/f_1$ Embodiment 2

$f = 1.000-1.886$, F/4.6-F/5.7
$2\omega = 61.9°-35.3°$
$r_1 = 3.7821$
$d_1 = 0.0763$   $n_1 =$ graded refractive index lens (1)
$r_2 = 2.0722$
$d_2 = 0.0283$
$r_3 =$ stop
$d_3 = 0.1819$
$r_4 = -2.5310$
$d_4 = 0.0908$   $n_2 =$ graded refractive index lens (2)
$r_5 = -0.4123$
$d_5 =$ variable
$r_6 =$ aspherical surface
$d_6 = 0.0935$   $n_3 = 1.57135$   $\nu_3 = 52.92$
$r_7 = -0.5065$
$d_7 = 0.1301$
$r_8 = -0.3529$
$d_8 = 0.0307$   $n_4 = 1.74100$   $\nu_4 = 52.68$
$r_9 = -1.1163$
aspherical surface
$r = -0.6054$,   $A_1 = 0$
$A_2 = 0.16117 \times 10$,   $A_3 = 0.10259 \times 10^2$
$A_4 = 0.71643 \times 10^2$,   $A_5 = -0.11396 \times 10^3$

| f | 1.000 | 1.372 | 1.886 |
|---|---|---|---|
| $d_5$ | 0.383 | 0.215 | 0.092 | graded refractive index lens (1)
$n_{0d} = 1.59270$,   $n_{1d} = -0.87790$
$n_{2d} = 0.23776 \times 10^2$,   $n_{3d} = 0.21675 \times 10^3$
$n_{0c} = 1.58780$,   $n_{1c} = -0.88757$
$n_{2c} = -0.10505 \times 10$,   $n_{3c} = 0.21443 \times 10^3$
$n_{0F} = 1.60459$,   $n_{1F} = -0.85443$
$n_{2F} = 0.22935 \times 10^2$,   $n_{3F} = 0.22243 \times 10^3$ -continued graded refractive index lens (2)

| | |
|---|---|
| $n_{0d} = 1.62029$, | $n_{1d} = -0.42139$ |
| $n_{2d} = -0.57137$, | $n_{3d} = -0.70888 \times 10$ |
| $n_{0c} = 1.61715$, | $n_{1c} = -0.42342$ |
| $n_{2c} = -0.57584 \times$, | $n_{3c} = 0.14196 \times 10^2$ |
| $n_{0F} = 1.62742$, | $n_{1F} = -0.41679$ |
| $n_{2F} = -0.51800$, | $n_{3F} = 0.90719 \times 10$ |
| $d_2/d_3 = 0.1556$, | $d_2 + d_3 = 0.283 \, f_1$ |
| $f_1 = 0.744$, | $1/f_{1F} = 0.005297/f_1$ |

Embodiment 3

| $f = 1.000-1.886$, | $F/4.6-F/5.7$ |
|---|---|
| $2\omega = 61.9°-35.3°$ | |

| | | |
|---|---|---|
| $r_1 = 1.5158$ | | |
| $d_1 = 0.0756$ | $n_1 =$ graded refractive index lens (1) | |
| $r_2 = 1.0131$ | | |
| $d_2 = 0.0353$ | | |
| $r_3 =$ stop | | |
| $d_3 = 0.1601$ | | |
| $r_4 = -4.1220$ | | |
| $d_4 = 0.1004$ | $n_2 =$ graded refractive index lens (2) | |
| $r_5 = -0.3617$ | | |
| $d_5 =$ variable | | |
| $r_6 =$ aspherical surface | | |
| $d_6 = 0.0907$ | $n_3 = 1.57135$ | $\nu_3 = 52.92$ |
| $r_7 = -0.4620$ | | |
| $d_7 = 0.1297$ | | |
| $r_8 = -0.3381$ | | |
| $d_8 = 0.0306$ | $n_4 = 1.74100$ | $\nu_4 = 52.68$ |
| $r_9 = -1.0740$ | | | aspherical surface

| | |
|---|---|
| $r = -0.5182$, | $A_1 = 0$ |
| $A_2 = 0.19037 \times 10$, | $A_3 = 0.15575 \times 10^2$ |
| $A_4 = 0.74412 \times 10^2$, | $A_5 = -0.11657 \times 10^3$ |

| $f$ | 1.000 | 1.373 | 1.886 |
|---|---|---|---|
| $d_5$ | 0.379 | 0.228 | 0.118 | graded refractive index lens (1)

| | |
|---|---|
| $n_{0d} = 1.58755$, | $n_{1d} = -0.12208 \times 10$ |
| $n_{2d} = 0.26945 \times 10^2$, | $n_{3d} = 0.24687 \times 10^3$ |
| $n_{0c} = 1.58270$, | $n_{1c} = -0.12382 \times 10$ |
| $n_{2c} = 0.27633 \times 10^2$, | $n_{3c} = 0.23928 \times 10^3$ |
| $n_{0F} = 1.59934$, | $n_{1F} = -0.11785 \times 10$ |
| $n_{2F} = 0.25279 \times 10^2$, | $n_{3F} = 0.26526 \times 10^3$ | graded refractive index lens (2)

| | |
|---|---|
| $n_{0d} = 1.50698$, | $n_{1d} = -0.54244$ |
| $n_{2d} = -0.10336 \times 10$, | $n_{3d} = -0.14764 \times 10^2$ |
| $n_{0c} = 1.50475$, | $n_{1c} = -0.53578$ |
| $n_{2c} = -0.15497 \times 10$, | $n_{3c} = -0.23908 \times 10^2$ |
| $n_{0F} = 1.51197$, | $n_{1F} = -0.55742$ |
| $n_{2F} = 0.12400$, | $n_{3F} = 0.57458 \times 10$ |
| $d_2/d_3 = 1.2205$, | $d_2 + d_3 = 0.267 \, f_1$ |
| $f_1 = 0.733$, | $1/f_{1F} = 0.002639/f_1$ |

Embodiment 4

| $f = 1.000-1.886$, | $F/4.6-F/5.7$ |
|---|---|
| $2\omega = 61.9°-35.3°$ | |

| | | |
|---|---|---|
| $r_1 = 1.8847$ | | |
| $d_1 = 0.0755$ | $n_1 =$ graded refractive index lens (1) | |
| $r_2 = 1.3158$ | | |
| $d_2 = 0.1278$ | | |
| $r_3 =$ stop | | |
| $d_3 = 0.0833$ | | |
| $r_4 = -2.5767$ | | |
| $d_4 = 0.0921$ | $n_2 =$ graded refractive index lens (2) | |
| $r_5 = -0.4284$ | | |
| $d_5 =$ variable | | |
| $r_6 =$ aspherical surface | | |
| $d_6 = 0.0925$ | $n_3 = 1.57135$ | $\nu_3 = 52.92$ |
| $r_7 = -0.5028$ | | |
| $d_7 = 0.1314$ | | |
| $r_8 = -0.3474$ | | |
| $d_8 = 0.0306$ | $n_4 = 1.74100$ | $\nu_4 = 52.68$ |
| $r_9 = -1.1909$ | | | aspherical surface

| | |
|---|---|
| $r = -0.6436$, | $A_1 = 0$ |
| $A_2 = 0.13666 \times 10$, | $A_3 = 0.11237 \times 10^2$ |
| $A_4 = 0.75026 \times 10^2$, | $A_5 = -0.11664 \times 10^3$ |

| $f$ | 1.000 | 1.373 | 1.886 |
|---|---|---|---|
| $d_5$ | 0.382 | 0.212 | 0.087 | graded refractive index lens (1)

| | |
|---|---|
| $n_{0d} = 1.60358$, | $n_{1d} = -0.89255$ |
| $n_{2d} = 0.23545 \times 10^2$, | $n_{3d} = 0.22305 \times 10^3$ |
| $n_{0c} = 1.59900$, | $n_{1c} = -0.90060$ |
| $n_{2c} = 0.23375 \times 10^2$, | $n_{3c} = 0.22195 \times 10^3$ |
| $n_{0F} = 1.61488$, | $n_{1F} = -0.87275$ |
| $n_{2F} = 0.23967 \times 10^2$, | $n_{3F} = 0.22572 \times 10^3$ | graded refractive index lens (2)

| | |
|---|---|
| $n_{0d} = 1.65195$, | $n_{1d} = -0.33301$ |
| $n_{2d} = -0.53317$, | $n_{3d} = -0.11279 \times 10^2$ |
| $n_{0c} = 1.64855$, | $n_{1c} = -0.33824$ |
| $n_{2c} = -0.69866$, | $n_{3c} = -0.12768 \times 10^2$ |
| $n_{0F} = 1.65969$, | $n_{1F} = -0.32114$ |
| $n_{2F} = -0.15695$, | $n_{3F} = -0.78947 \times 10$ |
| $d_2/d_3 = 1.534$, | $d_2 + d_3 = 0.280 \, f_1$ |
| $f_1 = 0.745$, | $1/f_{1F} = 0.002714/f_1$ |

Embodiment 5

| $f = 1.000-1.886$, | $F/4.6-F/5.7$ |
|---|---|
| $2\omega = 61.9°-35.3°$ | |

| | | |
|---|---|---|
| $r_1 = 5.0847$ | | |
| $d_1 = 0.0748$ | $n_1 =$ graded refractive index lens | |
| $r_2 = 2.4803$ | | |
| $d_2 = 0.1085$ | | |
| $r_3 =$ stop | | |
| $d_3 = 0.0993$ | | |
| $r_4 = -3.2703$ | | |
| $d_4 = 0.0191$ | $n_2 = 1.64769$ | $\nu_4 = 33.80$ |
| $r_5 = 3.2335$ | | |
| $d_5 = 0.0834$ | $N_3 = 1.65160$ | $\nu_3 = 58.52$ |
| $r_6 =$ aspherical surface(1) | | |
| $d_6 =$ variable | | |
| $r_7 =$ aspherical surface (2) | | |
| $d_7 = 0.0933$ | $n_4 = 1.57135$ | $\nu_4 = 52.92$ |
| $r_8 = -0.4927$ | | |
| $d_8 = 0.1299$ | | |
| $r_9 = -0.3500$ | | |
| $d_9 = 0.0306$ | $n_4 = 1.74100$ | $\nu_5 = 52.68$ |
| $r_{10} = 1.2053$ | | | aspherical surface (1)

| | |
|---|---|
| $r = -0.4281$, | $A_1 = 0$ |
| $A_2 = 0.53557$, | $A_3 = 0.14714 \times 10$ |
| $A_4 = 0.46840$, | $A_5 = 0.51781 \times 10^{-1}$ | aspherical surface (2)

| | |
|---|---|
| $r = -0.6220$, | $A_1 = 0$ |
| $A_2 = 0.13754 \times 10$, | $A_3 = 0.99170 \times 10$ |
| $A_4 = 0.72187 \times 10^2$, | $A_5 = -0.11705 \times 10^3$ |

| $f$ | 1.000 | 1.373 | 1.886 |
|---|---|---|---|
| $d_5$ | 0.382 | 0.213 | 0.089 | graded refractive index lens

| | |
|---|---|
| $n_{0d} = 1.60342$, | $n_{1d} = -0.87771$ |
| $n_{2d} = 0.23293 \times 10^2$, | $n_{3d} = 0.21113 \times 10^3$ |
| $n_{0c} = 1.59883$, | $n_{1c} = -0.88307$ |
| $n_{2c} = 0.23392 \times 10^2$, | $n_{3c} = 0.20628 \times 10^3$ |
| $n_{0F} = 1.61471$, | $n_{1F} = -0.86452$ |
| $n_{2F} = 0.23049 \times 10^2$, | $n_{3F} = 0.22307 \times 10^3$ |
| $d_2/d_3 = 1.093$, | $d_2 + d_3 = 0.2778 \, f_1$ |
| $f_1 = 0.748$, | $1/f_{1F} = 0.00620/f_1$ | wherein the reference symbols $r_1, r_2, \ldots$ represent radii of curvature on the surfaces of the respective lens elements, the reference symbols $d_1, d_2, \ldots$ designate thicknesses of the respective lens elements and the airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements. When the direction along the optical axis is taken as the x axis and the direction perpendicular to the x axis is taken as the y axis, shape of the aspherical surfaces used in the Embodiments is expressed by the following formula:

$$x = \frac{y^2/r}{1 + \sqrt{1 - (y/r)^2}} + \sum_{i=1}^{5} A_i y^{2i}$$

wherein the reference symbol r represents radius of curvature at the vertex of the aspherical surface and the reference symbol $A_i$ designates the aspherical surface coefficient.

Further, when the direction perpendicular to the optical axis is taken as the y axis, refractive index distribution of the graded refractive index lens at a wavelength $\lambda$ is given by the following formula:

$$n_\lambda(y) = \sum_{i=0}^{3} n_{i\lambda} y^{2i}$$

wherein the reference symbol $n_{i\lambda}$ represents the coefficient at a wavelength of $\lambda$. In the numerical data, the reference symbols $n_{0d}, n_{1d}, \ldots$ represent the coefficients for the d-line, the reference symbols $n_{0c}, n_{1c}, \ldots$ designate the coefficients for the c-line, and the reference symbols $n_{0F}, n_{1F}$ denote the coefficients for the F-line.

Figure 1B:
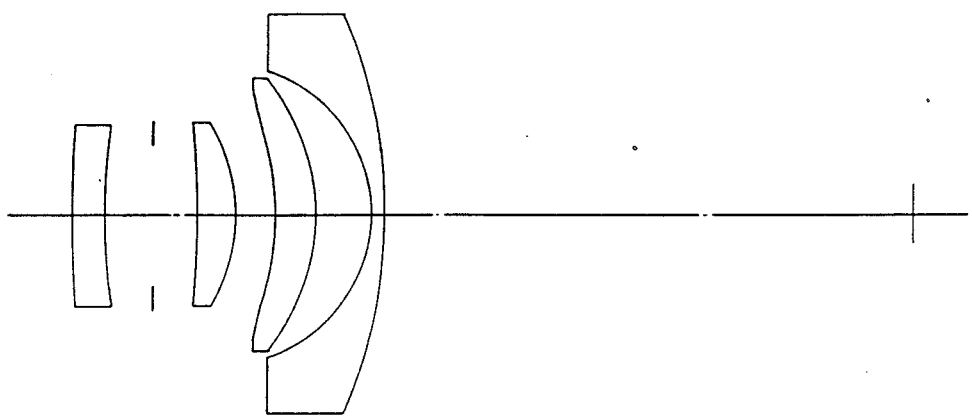

The Embodiment 1 has the composition illustrated in FIG. 1 wherein both the subunits of the first lens unit are designed as graded refractive index lenses. Performance of the zoom lens system can be improved by dividing these subunits into a larger number of lens components. In addition, the first subunit arranged in the first lens unit has a very weak power so that the power of the first lens unit is concentrated on the second subunit. Accordingly, the zoom lens system is scarcely degraded in the performance thereof even when the first subunit and the second subunit are a little eccentric, and can be manufactured rather easily in practice.

The first subunit of the first lens unit adopted for the Embodiment 1 has such a refractive index distribution as to lower refractive index as the lens portions are farther from the optical axis within the range relatively close to the optical axis, but to enhance refractive index as the lens portions are farther from the optical axis within the range relatively close to the edge of the effective diameter thereof. This graded refractive index lens serves for favorably correcting astigmatism at the wide position as well as spherical aberration and sine condition at the tele position.

Figure 3:
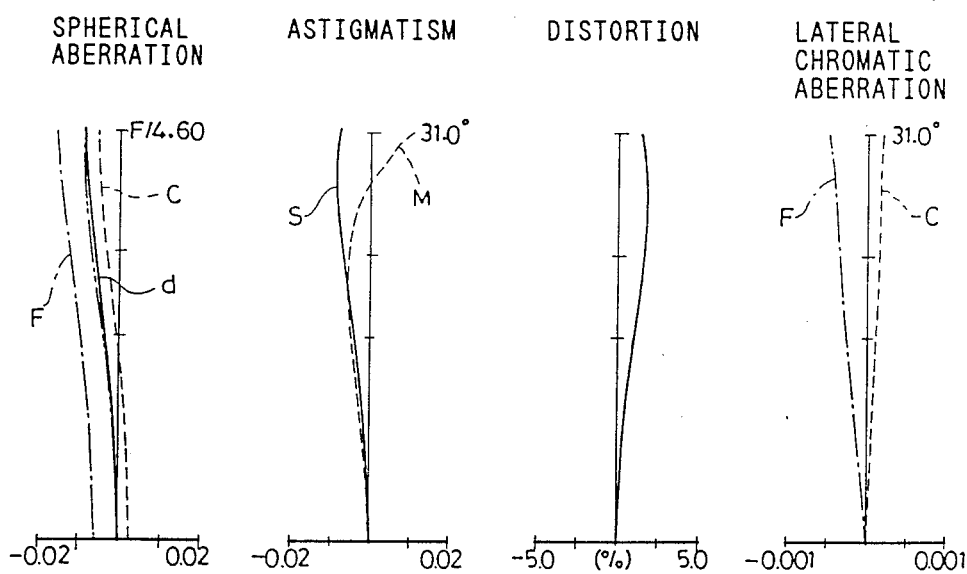
FIG. 3 through FIG. 5 show graphs illustrating aberration characteristics of the Embodiment 1 of the present invention.
Figure 4:
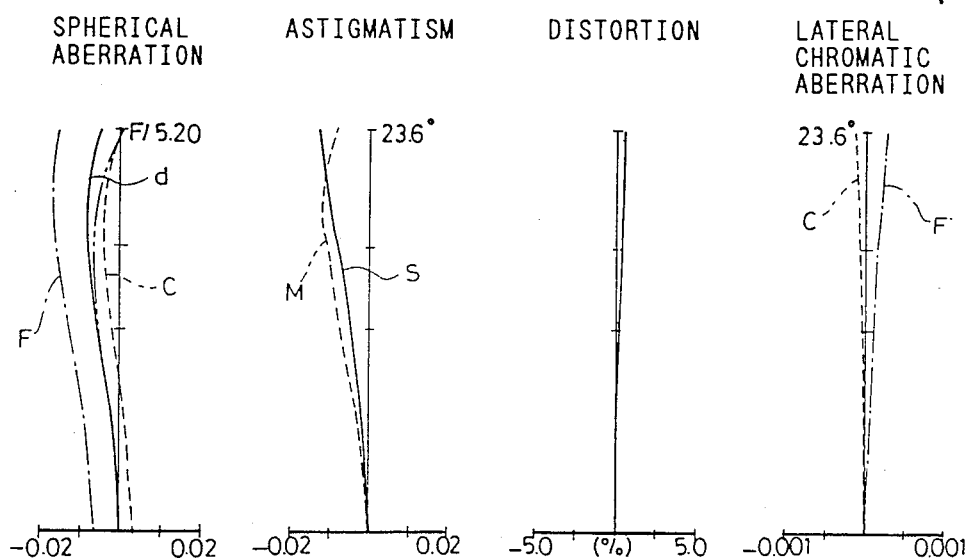
Figure 5:
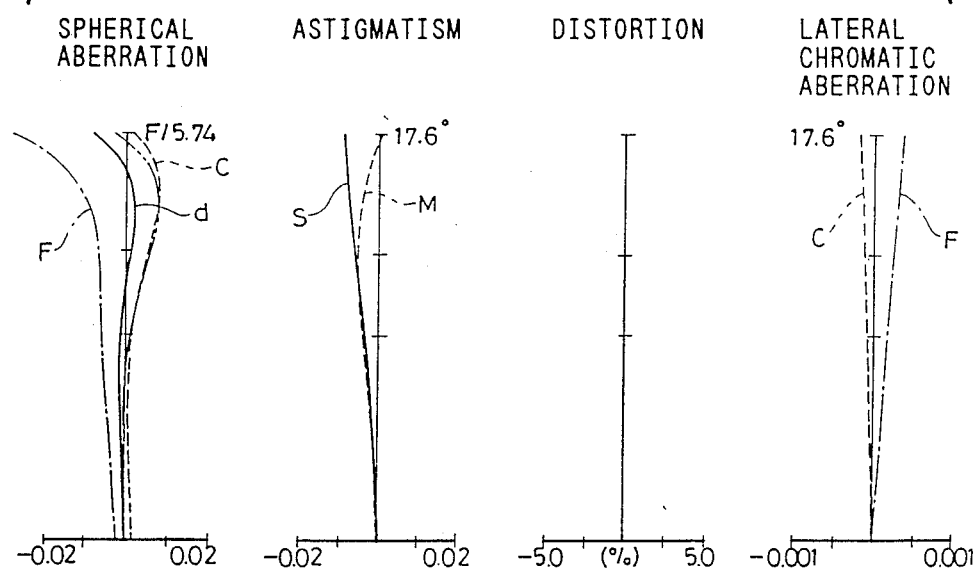

Aberration characteristics at the wide position, intermediate focal length and tele position of the Embodiment 1 are illustrated in FIG. 3, FIG. 4 and FIG. 5 respectively.

The Embodiment 2 also has the composition illustrated in FIG. 1 and comprises an aperture stop located as close to the object side as possible. Speaking concretely, the aperture stop is arranged in the vicinity of the center of curvature of the fifth surface ($r_5$) which has the greatest influence on distortion in the first lens unit. Owing to this arrangement of the aperture stop, production degree of distortion is adjusted in the first lens unit so that distortion is little in the zoom lens system as a whole in all the zooming conditions.

Further, the Embodiment 2 has the maximum value of $f_1/f_{1F}$, concretely $0.00597/f_1$, among the Embodiments wherein the first lens unit is composed of two lens components.

Figure 6:
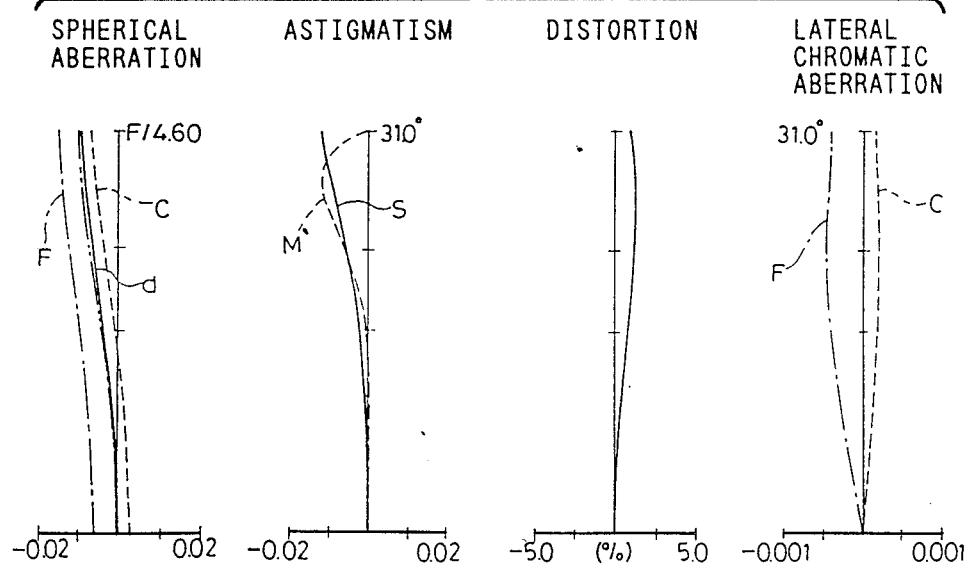
FIG. 6 through FIG. 8 show graphs illustrating aberration characteristics of the Embodiment 2 of the present invention.
Figure 7:
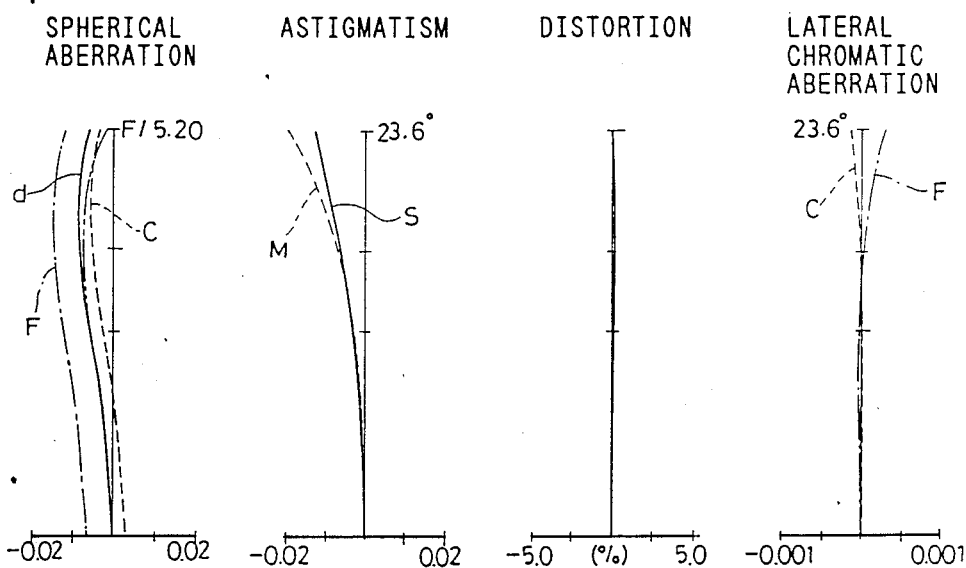
Figure 8:
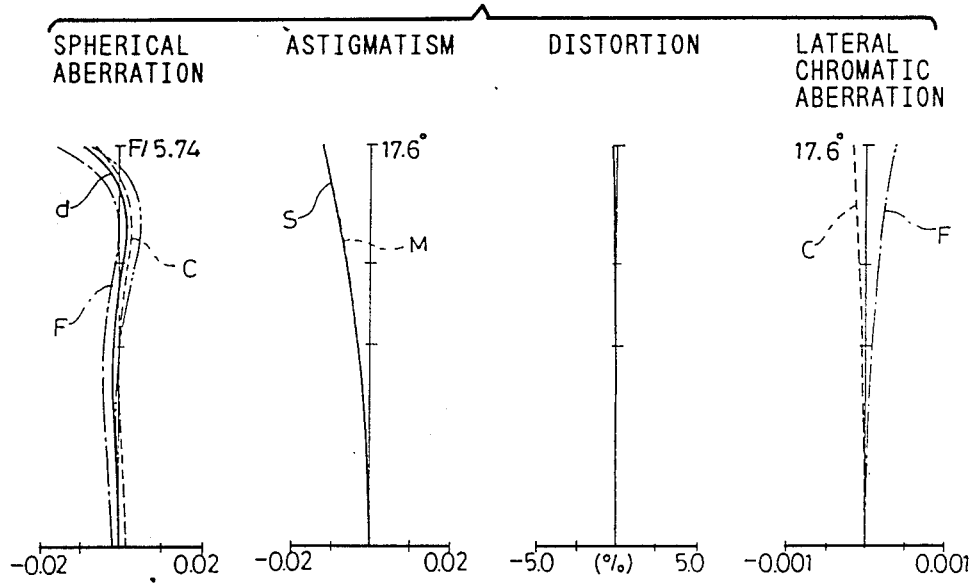

Aberration characteristics at the wide position, intermediate focal length and tele position of the Embodiment 2 are visualized in FIG. 6, FIG. 7 and FIG. 8 respectively.

The Embodiment 3 has the composition shown in FIG. 1 as well wherein the aperture stop is shifted toward the object side. Further, the Embodiment 3 has the shortest total length at the wide position among all the Embodiments, i.e., 1.223 times as long as the focal length of the zoom lens system.

Figure 9:
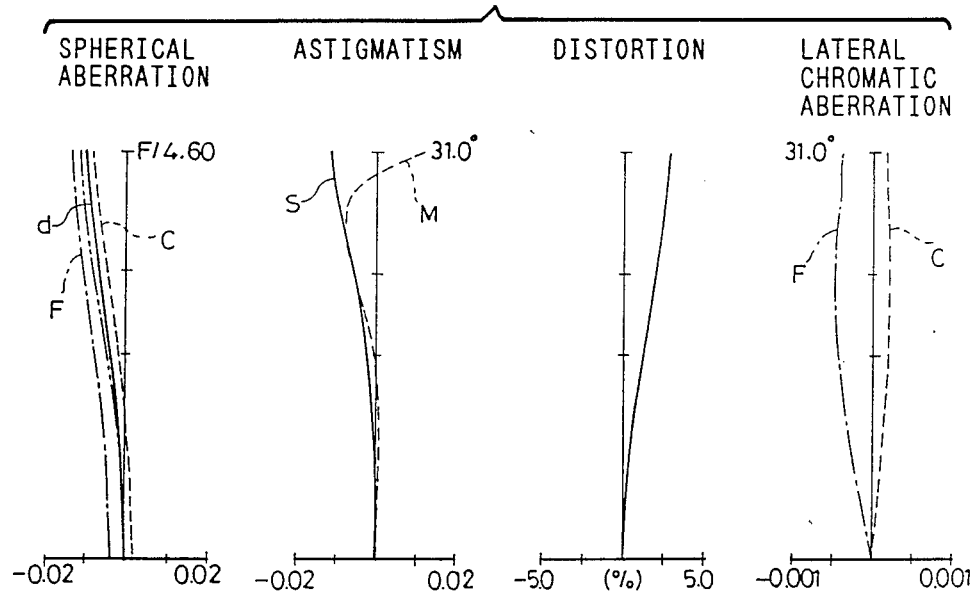
FIG. 9 through FIG. 11 show curves illustrating aberration characteristics of the Embodiment 3 of the present invention.
Figure 10:
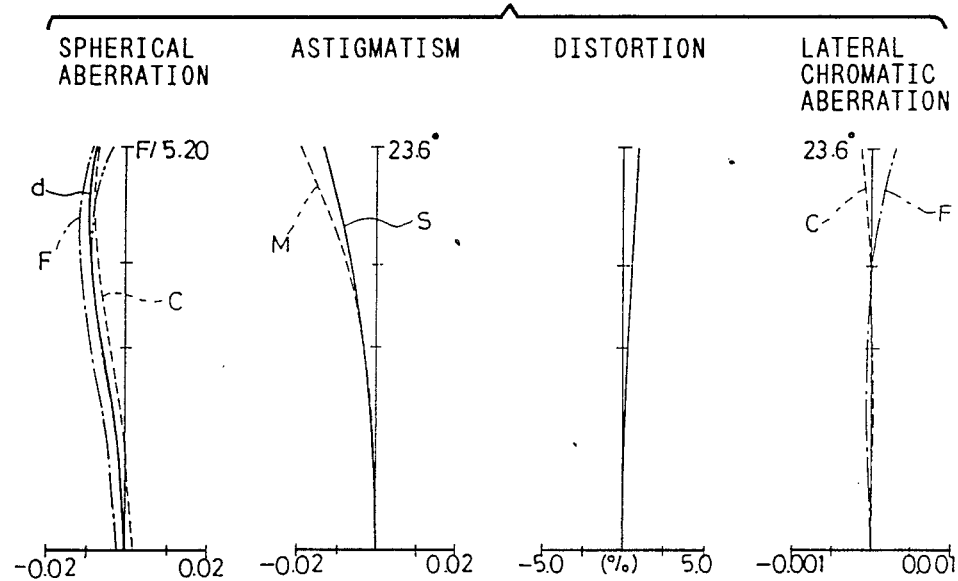
Figure 11:
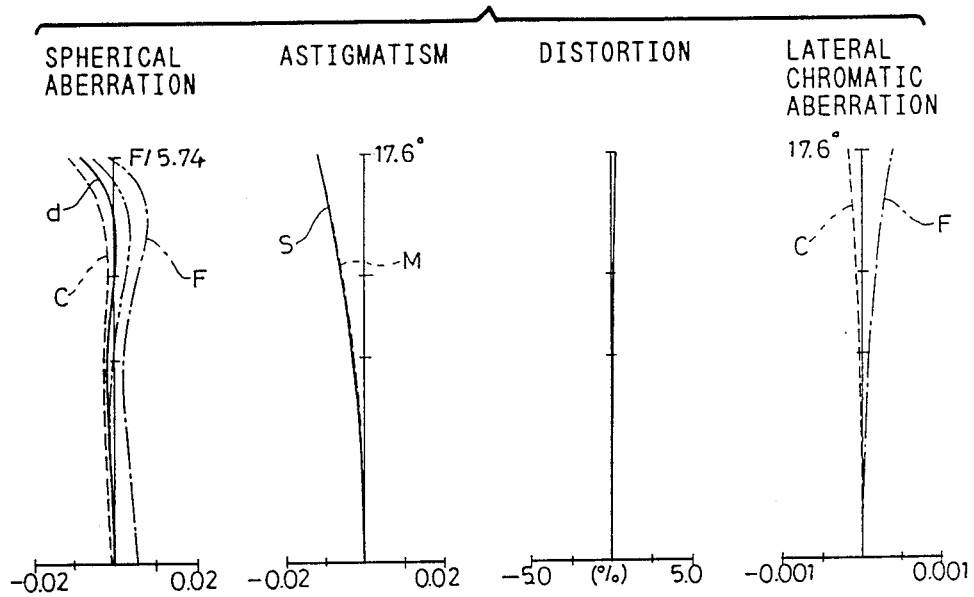

Aberration characteristics at the wide position, intermediate focal length and tele position of the Embodiment 3 are illustrated in FIG. 9, FIG. 10 and FIG. 11 respectively.

The Embodiment 4 also has the composition shown in FIG. 1 but exemplifies a case where the aperture stop is shifted farthest toward the image side. This location of the aperture stop leads the principal ray so as to pass through a relatively low portion of the first lens unit, thereby allowing curvature of chromatic aberration to be hardly produced.

Figure 12:
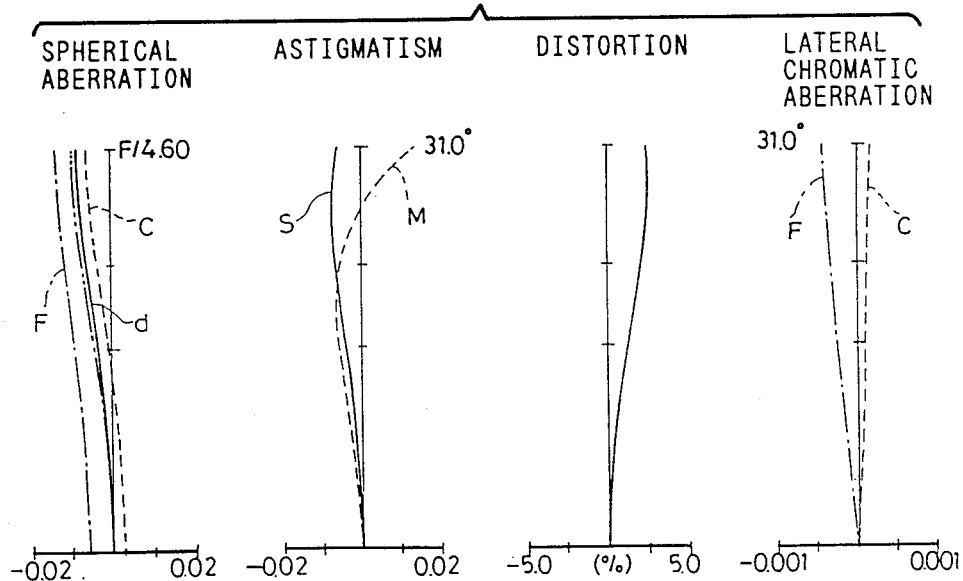
FIG. 12 through FIG. 14 show curves illustrating aberration characteristics of the Embodiment 4 of the present invention.
Figure 13:
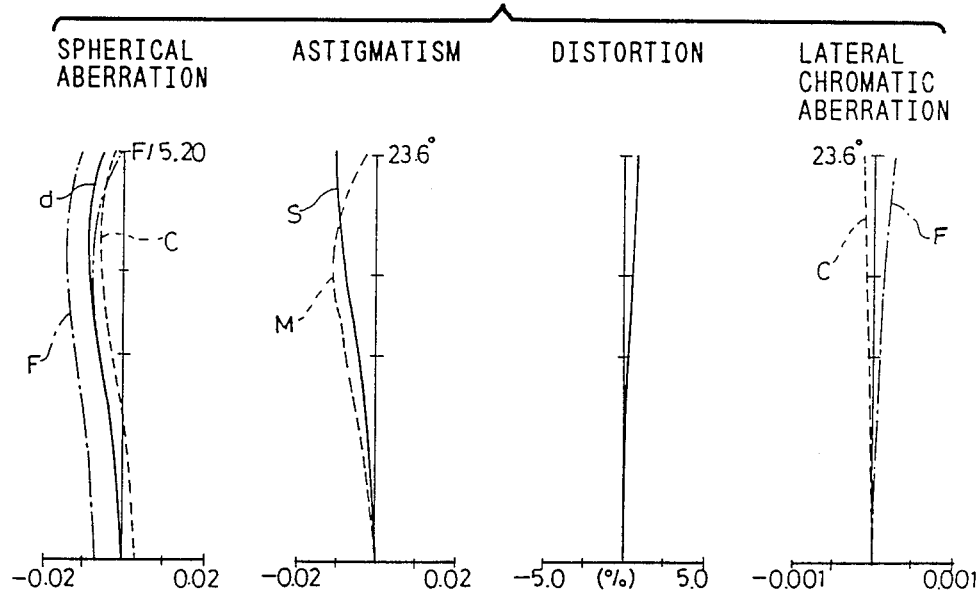
Figure 14:
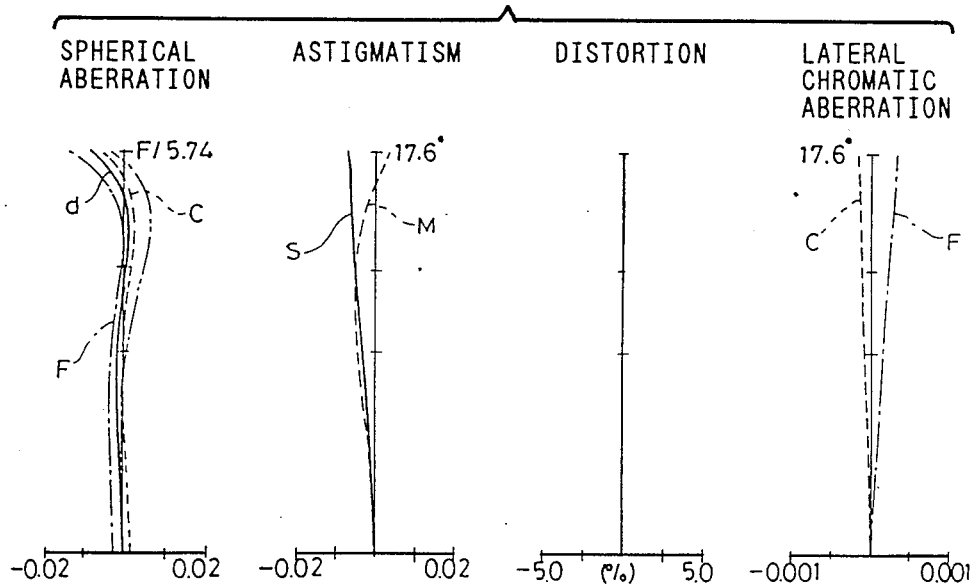

Aberration characteristics at the wide position, intermediate focal length and tele position of the Embodiment 4 are visualized in FIG. 12, FIG. 13 and FIG. 14 respectively.

As is understood from the foregoing description on the Embodiments 1 through 4, the zoom lens system according to the present invention permits locating the aperture stop relatively freely and facilitates design of lens barrels.

Figure 2A:
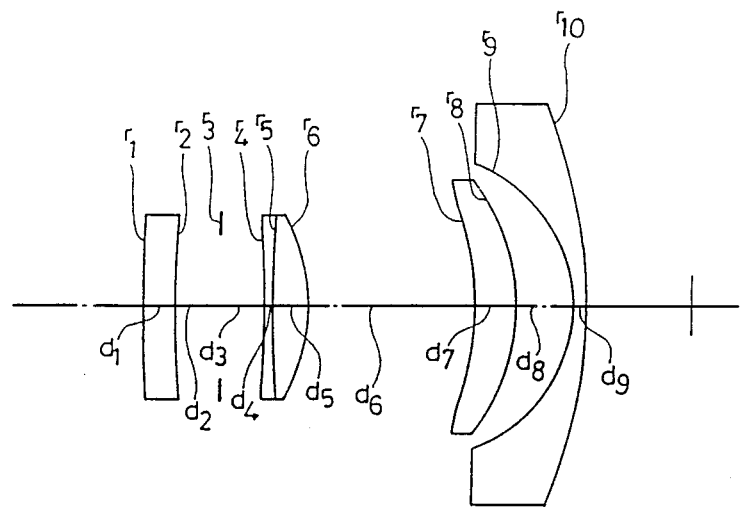
FIG. 2 shows sectional views illustrating composition of Embodiment 5 of the zoom lens system according to the present invention.
Figure 2B:
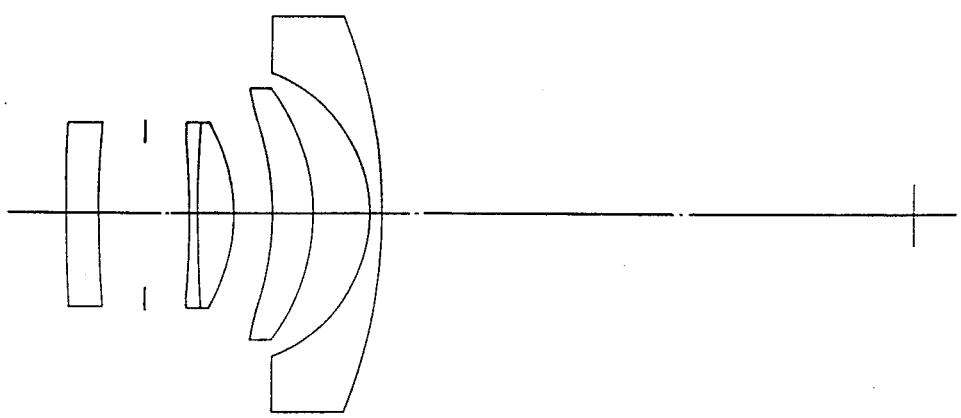

The Embodiment 5 has the composition shown in FIG. 2 wherein the second subunit arranged in the first lens unit is designed as a cemented doublet consisting of homogeneous lens elements and the zoom lens system as a whole consists of five lens elements.

As exemplified by the Embodiment 5, the zoom lens system according to the present invention permits replacing the graded refractive index lenses with homogeneous lenses by increasing number of the lens elements.

As is understood from the description on the Embodiment 1, the graded refractive index lens used as the second subunit greatly contributes to correction of chromatic aberration in the first lens unit. It is easy to replace this second subunit with a homogeneous lens having an aspherical surface.

As compared with the Embodiments 1 through 4, the Embodiment 5 comprises a larger number of lens elements and requires an additional manufacturing stage to cement lens elements.

The lens system disclosed by Japanese Unexamined Published Patent Application No. 38711/64 similarly comprises five lens elements but requires extremely minimizing eccentricity for obtaining favorable performance since each of the three lens elements composing the first lens unit has strong power.

The zoom lens system preferred as the Embodiment 5 of the present invention allows little degradation of the performance thereof and can easily be manufactured owing to the fact that power of the first lens unit is concentrated on the second subunit.

Further, the Embodiment 5 has the maximum value of $f_1/f_{1F}$, concretely $0.006200/f_1$, among all the Embodiments.

Figure 15:
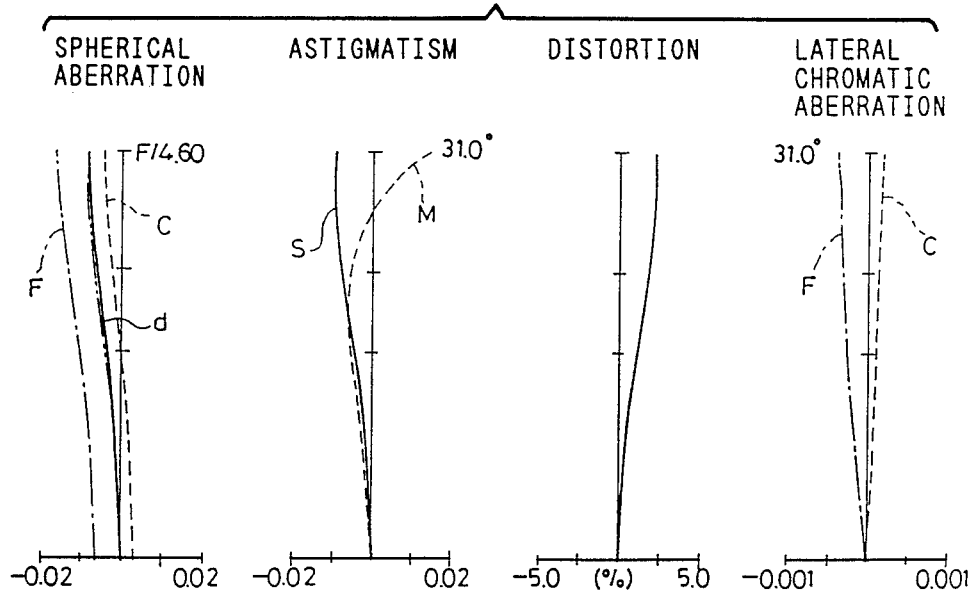
FIG. 15 through FIG. 17 show graphs illustrating aberration characteristics of the Embodiment 5 of the present invention.
Figure 16:
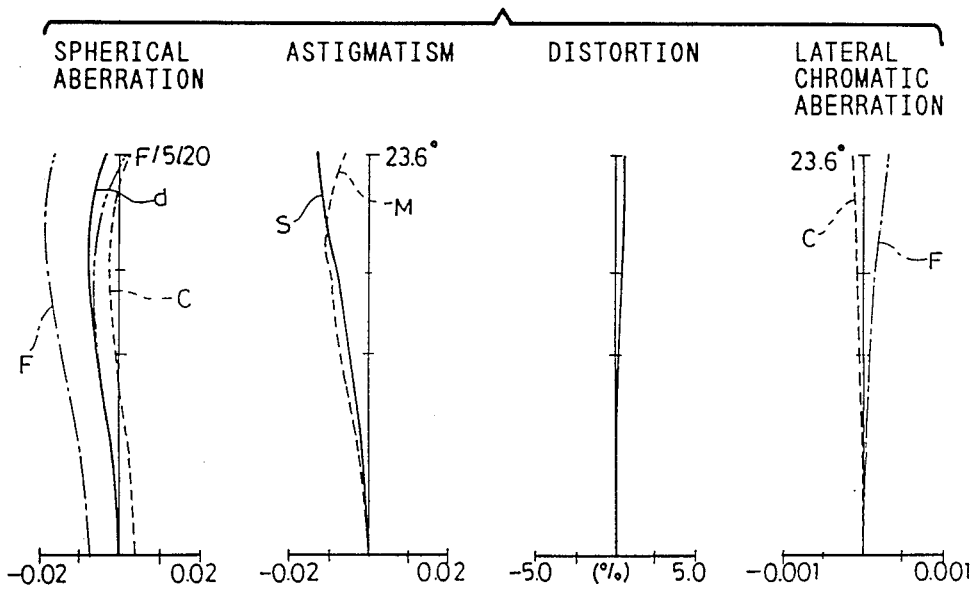
Figure 17:
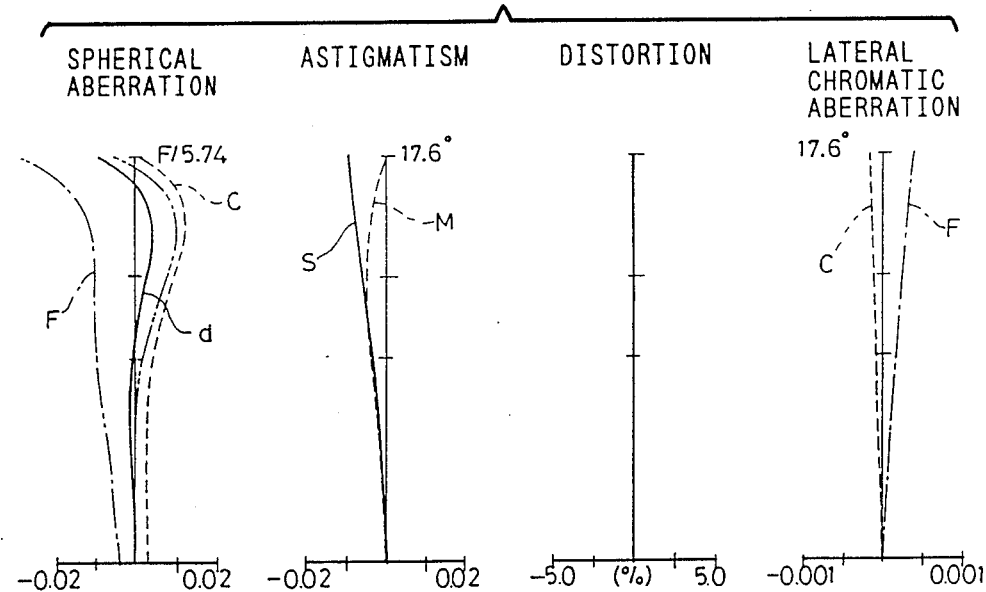

Aberration characteristics at the wide position, intermediate focal length and tele position of the Embodiment 5 are illustrated in FIG. 15, FIG. 16 and FIG. 17 respectively.

As is understood from the foregoing description, the zoom lens system according to the present invention is compact, short in total length thereof, comprises a very small number of lens elements and has favorable performance.

I claim:

1. A compact zoom lens system comprising, in the order from the object side, a first lens unit having positive refractive power and a second lens unit having negative refractive power, and so adapted as to vary focal length thereof by varying the airspace reserved between said first lens unit and said second lens unit, said first lens unit comprising an aperture stop, at least one lens component arranged on the object side of said aperture stop and at least one lens component arranged on the image side of said aperture stop, and at least one lens element arranged in said first lens unit being designed as a radial GRIN lens.

2. A compact zoom lens system according to claim 1 wherein said first lens unit comprises a first subunit having positive power and arranged on the object side of said aperture stop, and a second subunit having positive power and arranged on the image side of said aperture stop.

3. A compact zoom lens system according to claim 1 or 2 wherein said first lens unit comprises at least two graded refractive index lenses.

4. A compact zoom lens system according to claim 3 satisfying the following conditions (1) and (2):

$$0.1 < d_2/d_3 < 1.7 \tag{1}$$

$$f_1/5 < d_2 + d_3 < f_1/2 \tag{2}$$

wherein the reference symbol $f_1$ represents focal length of said first lens unit, the reference symbol $d_2$ designates the airspace reserved between the first subunit of said first lens unit and said aperture stop, and the reference symbol $d_3$ denotes the airspace reserved between said aperture stop and the second subunit of said first lens unit.

5. A compact zoom lens system according to claim 4 satisfying the following condition (3):

$$0 < 1/f_{1F} < 0.007/f_1 \tag{3}$$

wherein the reference symbol $f_{1F}$ represents focal length of said first subunit.

6. A compact zoom lens system according to claim 1 or 2 satisfying the following conditions (1) and (2):

$$0.1 < d_2/d_3 < 1.7 \tag{1}$$

$$f_1/5 < d_2 + d_3 < f_1/2 \tag{2}$$

wherein the reference symbol $f_1$ represents focal length of said first lens unit, the reference symbol $d_2$ designates the airspace reserved between the first subunit of said first lens unit and said aperture stop, and the reference symbol $d_3$ denotes the airspace reserved between said aperture stop and the second subunit of said first lens unit.

7. A compact zoom lens system according to claim 6 satisfying the following condition (3):

$$0 < 1/f_{1F} < 0.007/f_1 \tag{3}$$

wherein the reference symbol $f_{1F}$ represents focal length of said first subunit.

8. A compact zoom lens system according to claim 1 wherein each of the lens components comprised in said first lens unit has positive refractive power.

9. A compact zoom lens system according to claim 2 wherein the surface having the strongest refractive power in said second subunit is concave with regard to said aperture stop.

10. A compact zoom lens system according to claim 1 wherein said second lens unit comprises a negative meniscus lens component arranged on the extremely image side and having a convex surface on the image side.

11. A compact zoom lens system according to claim 2 wherein both of the extremely object side surface and the extremely image side surface of said first subunit are convex on the object side.

12. A compact zoom lens system according to claim 1 wherein any one of the surfaces arranged in said zoom lens system is designed as an aspherical surface expressed by the following formula:

$$x = \frac{y^2/r}{1 + \sqrt{1 - (y/r)^2}} + \sum_{i=1}^{5} A_i y^{2i}$$

wherein the reference symbol r represents radius of curvature at the vertex of said aspherical surface and the reference symbol $A_i$ designates the aspherical surface coefficient.

* * * * *